United States Patent Office 3,217,399
Patented Nov. 16, 1965

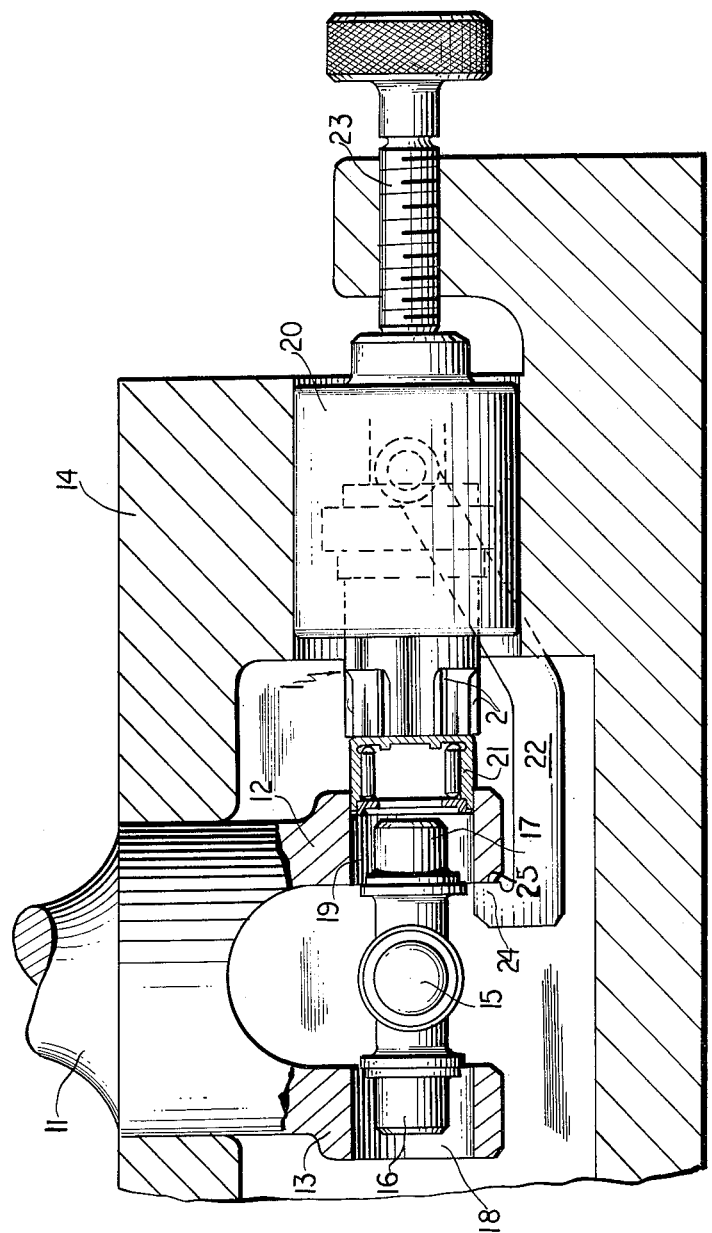

3,217,399
UNIVERSAL JOINT ASSEMBLY METHOD AND APPARATUS
Karl Spiess and Harald Schönfeld, both of Herzogenaurach, Germany, assignors to Industriewerk Schaeffler OHG, Herzogenaurach, Germany, a corporation of Germany
Filed Dec. 14, 1964, Ser. No. 418,150
Claims priority, application Germany, Dec. 19, 1963, I 24,322
3 Claims. (Cl. 29—437)

The invention relates to an improved method for assembling universal joints formed by the connection of two shafts forked at their ends with a universal joint spider and having radially and axially loadable bearings arranged in bores in the shaft forks for accommodating the spider trunnions and a novel apparatus for performing the said method.

In our copending, commonly assigned application Serial No. 391,246, filed August 27, 1964, there is described a method of assembling universal joints of this type. The said method comprises centering the spider and the shaft forks relative to one another, pressing bearings into the bores of the fork arms until they abut without free play against the spider trunnions while supporting the reaction force resulting from the pressing in force at the fork arms and securely fixing the bearing on the base of the fork arm. One means of securely fixing the bearing is cold forming noses from the bore wall by impact extrusion with a ram provided with projections whose outer edges are on a diameter greater than the diameter of the bore, whereby the said noses bear against the end face of the bearing sleeve.

The number of noses required depends upon the axial forces that the bearing is subjected to in its operation and the axial forces are determined by the speed of rotation during the operation of the universal joint and on the compactness of the joint and on the distance of the bearings from the axis of the said joint. However, the number of noses capable of being formed is limited by the amount of force which can be applied to form the said noses. In our said copending application, the reaction forces from the pressing-in and impact extrusion forces are transmitted to the fork arms through special holding clips or clamps. In small and fast rotating universal joints, the space for accommodating the holding clips is very small and the clips are applied to the outer edges of the fork arms. The fork arms of said universal joints are frequently destroyed by the large amount of force required to form the large number of noses required by the axial forces to which the bearing is subjected.

It is an object of the invention to provide an improved method of assembling universal joints wherein the formed-on noses to hold the bearings in position are formed in series.

In is another object of the invention to provide an improved method of assembling universal joints wherein the force required to form noses to hold the bearings in position is held at a minimum.

It is an object of the invention to provide a novel apparatus for forming noses on the bore of a shaft arm of a universal joint to hold the bearings in place.

These and other objects and advantages of the invention will become obvious from the following detailed description.

The improved method of the invention for assembling universal joints formed by the connection of two shafts forked at their ends with a universal joint spider and having radially and axially loadable bearings for accommodating the spider trunnions arranged in bores in the shaft forks comprises centering the spider and shaft forks relative to one another, pressing each bearing into the bore of the fork arm until it abuts without free play against the spider trunnion while supporting the reaction force resulting from the pressing-in force at the fork arm and securely fixing the said bearing in the bore of the shaft fork by cold forming in successive steps groups of noses from the bore walls which bear against the end face of the bearing.

By cold-forming the noses in successive groups, the forces necessary to form each group of noses is less than that required to form all the noses at once and the shaft forks will not be destroyed. This may be accomplished by rotating the annular ram used in the impact extrusion at a predetermined angle after the formation of each group of noses. The rotation of the said ram may be simply effected by connecting the piston with a stepwise advancing mechanism which will move the ram the desired number of degrees by advancing or falling back for example.

The apparatus of the invention for assembling universal joints according to the method of the invention is comprised of a ram means provided with projections whose outer edges lie on a diameter longer than the bore diameter for pressing in and fixing the bearing in the bore of the shaft fork arm, pressure applying means connected to the said ram means to provide the pressing-in force and the force for forming noses in the bore to fix the bearing in place and displaceable relative to the fork arm in the axial direction of the bore, adjustable abutment means to limit the displacement travel of the pressure applying means opposite to the pressing-in direction and means for transmitting reaction forces between the pressure applying means and the fork arm, the said ram means being rotatable to form the noses in the bore in groups.

Referring now to the drawings:

FIG. 2 is a diagrammatically illustrated apparatus for assembling universal joints by the method of the invention.

Figure 1:
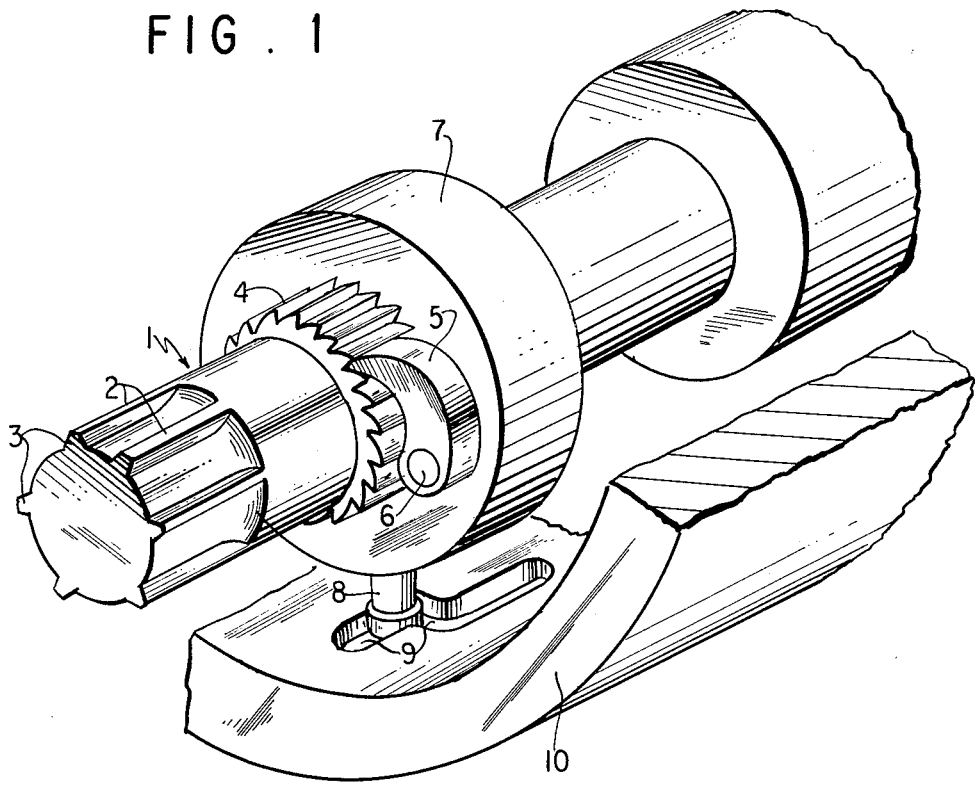
FIG. 1 illustrates a single ram embodiment for pressing in and fixing the bearing in the bore of the fork arm.

In the embodiment of FIG. 1, the ram 1 simultaneously presses-in the bearing into the bore of the shaft fork and forms the noses from the bore wall. The ram 1 has peripheral projections 2 whose outer edges are on a diameter greater than that of the bore and the front surfaces 3 of the projections 2 are at an angle of 60° to 90° with respect to the longitudinal axis of the ram. About the periphery of the ram 1, there is a gear train 4 which engages with ratchet 5, the latter being movably connected through bolt 6 to disc 7 mounted on ram 1 and rotatable in a peripheral direction but not movable in the axial direction. A bolt 8 is securely connected to disc 7 and is engaged with a Z-shaped groove 9 in part 10 which is fixedly mounted opposite the ram 1. The disc 7 is rotated by bolt 8 in the curved groove 9 which is relayed to ram 1 through the ratchet 5 and the gear train 4 thereby turning the ram 1 to a specified position. When the ram advances, the disc 7 is rotated in the opposite direction and the ratchet 5 is lifted by the cogs of the gear train 4 whereby the rotation is not relayed to the ram 1. In place of a single ram a double ram may be used which first presses in the bearing and then forms the groups of noses in succession.

FIG. 2 shows diagrammatically an apparatus at the beginning of the method of the invention. The shaft 11, provided with fork arms 12 and 13 at its end, is fixed in apparatus 14. A universal joint spider 15 comprising two trunnions 16 and 17 which are at right angles to the shaft 11 is held by a mounting (not shown) and its position therein is centered with respect to the shaft 11 and bores 18 and 19 in the fork arms 12 and 13, respectively. Device 20 produces a force which through the agency of ram 1 presses bearing 21 into the bore 19 of fork arm 12 until play-free abutment of the bearing 21 against the trunnion 17 is brought about and simultaneously forms noses in the bore 19 so that the bearing 21 is fixed in the bore. A supporting clip 22 is provided between device 20 and fork arm 12 with hook 24 applied against inner surface 25 of fork arm 12 to transmit the reaction force resulting from the pressing-in and nose-forming operation which begins by device 20 to fork arm 12. Adjustable abutment member 23 is provided which, before or during the pressing-in operation, is brought into the position of abutment and then shifted back to the desired extent for displacement of device 20. After bearing 21 has been pressed in and the first group of noses formed by projections 2, the ram 1 is rotated and additional groups of noses are formed in the bore.

Various modifications of the apparatus of the invention may be made without departing from the spirit or scope thereof and it is to be understood that the invention is to be limited only as defined in the appended claims.

We claim:

1. A method for assembling universal joints formed by the connection of two shafts forked at their ends with a universal joint spider and having radially and axially loadable bearings for accommodating the spider trunnions arranged in bores in the shaft forks which comprises centering the spider and shaft forks relative to one another, pressing each bearing into the bore of the fork arm until it abuts without free play against the spider trunnion while supporting the reaction force resulting from the pressing-in force at the fork arms and securely fixing the said bearing in the bore of the shaft fork by cold forming in successive steps a group of noses from the bore walls which bear against the end face of the bearing.

2. An apparatus for assembling universal joints formed by the connection of two shafts forked at their ends with a universal joint spider and having radially and axially loadable bearings for accommodating the spider trunnions in bores in the shaft forks comprising a ram means provided with projections whose outer edges lie on a diameter longer than the bore diameter for pressing in and fixing the bearing in the bore of the shaft fork arm, pressure applying means connected to the said ram means to provide the pressing-in force and the force for forming noses in the bore to fix the bearing in place and displaceable relative to the fork arm in the axial direction of the bore, adjustable abutment means to limit the displacement travel of the pressure applying means opposite to the pressing-in direction and means for transmitting reaction forces between the pressure applying means and the fork arm, the said ram means being rotatable to form the noses in the bore in groups.

3. The apparatus of claim 2 wherein the ram means is rotatable through a specific angle after forming each group of noses.

References Cited by the Examiner

UNITED STATES PATENTS

| 2,737,706 | 3/1956 | Isaac et al. | 29—148.4 |
| 2,768,725 | 10/1956 | Foulds et al. | 29—511 X |
| 3,008,226 | 11/1961 | Kellerman | 29—201 |

WHITMORE A. WILTZ, *Primary Examiner.*